Oct. 9, 1923. 1,469,852
L. H. SIMPSON
MACHINE FOR CUTTING SOAP OR OTHER PLASTIC MATERIAL
Filed Feb. 3, 1922  6 Sheets-Sheet 1

Oct. 9, 1923.  
L. H. SIMPSON  
1,469,852  
MACHINE FOR CUTTING SOAP OR OTHER PLASTIC MATERIAL  
Filed Feb. 3, 1922  6 Sheets-Sheet 5

Patented Oct. 9, 1923.

1,469,852

UNITED STATES PATENT OFFICE.

LOUIS H. SIMPSON, OF MALDEN, MASSACHUSETTS, ASSIGNOR TO POTTER DRUG & CHEMICAL CORPORATION, OF MALDEN, MASSACHUSETTS, A CORPORATION OF MAINE.

MACHINE FOR CUTTING SOAP OR OTHER PLASTIC MATERIAL.

Application filed February 3, 1922. Serial No. 533,741.

*To all whom it may concern:*

Be it known that I, LOUIS H. SIMPSON, of Malden, in the county of Middlesex and State of Massachusetts, a citizen of the United States, have invented a new and useful Improvement in Machines for Cutting Soap or Other Plastic Material, of which the following is a full, clear, and exact description, reference being had to the accompanying drawings, forming a part of this specification in explaining its nature.

The present invention relates to a machine for cutting soap or other plastic material into cakes though especially relating to a soap-cutting machine in accordance with the objects of the invention hereinafter recited.

The general object of the invention is to provide a machine capable of automatically taking care of the soap when ejected from a soap plodder in a continuous bar, and of cutting the soap into cakes.

Among the other detailed objects are the following:—

To provide mechanism whereby a bar section may initially be severed from the continuous bar issuing out of the plodder. As the soap is traveling continuously from the plodder an extremely quick cut is desired in order that the angle of cut may be made as short as possible.

To provide mechanism whereby the severed bar section may be brought forward ahead of the oncoming bar from the plodder and positioned for cutting into cakes. In this connection it is desired that the severed bar section be carried forward and positioned for cutting within the path of the oncoming bar and that the severed section be carried forward as short a distance as possible; in other words, that the bar section be carried forward ahead of the oncoming bar at a speed that will enable the positioning of the oncoming bar section and completion of the cutting and other operations before the oncoming bar has reached the severed section lying in its path.

To provide mechanism whereby severed bar sections may be cut into determinate lengths irrespective of the fact that the plodder for various reasons will not deliver soap at a constant speed.

To provide mechanism whereby wires may be employed for cutting the soap into cakes, as this is the only successful way by which high grade toilet soap may be cut accurately to a given weight and leave a proper square end on each cake.

To provide mechanism whereby the soap will not be marred during its manipulation as roughness and imperfections will not press out in milled soaps.

To provide mechanism whereby the cakes of soap after the cutting operation may be placed uniformly on racks and thereby best positioned for further handling.

Other objects will appear in the light of the description of the invention presently to be made, all of which can best be seen and understood by reference to the drawings, in which—

Fig. 3 is a side elevation of parts in the inner end of the way later to be referred to.

Fig. 4 is a front elevation of certain mechanism at the fore end of the machine.

Fig. 6 is a cross vertical section of the clutch later to be referred to.

Fig. 7 is a section on the line 7—7 of Fig. 1.

Fig. 12 is a vertical section of the soap gripping and carrying device later to be referred to.

1 represents diagrammatically a portion of a soap plodder, 2 representing the mouth of the plodder through which the soap is ejected to issue in a continuous bar *a*.

3 represents various frame portions of the machine capable of carrying the parts later to be referred to.

Arranged just in front of the mouth of the plodder and supported by the frame of the machine are spaced rails 4, 4 carrying between them a series of rolls 5, which form a stationary way over which the bar of soap issuing from the plodder passes, or a detached section thereof is advanced as will later be explained. The way over which the soap thus passes lies directly in the path of the bar issuing from the plodder.

As the bar from the plodder passes onto the inner end of the way it enters between one of the rolls 5 and an upper complementary roll 6. The roll 6 is arranged to turn in side-supporting plates 7 fixed to the rails 4, 4. During its passage along the way the bar is supported against lateral displacement by guides 8.

The machine is operated intermittently as will later be explained when reference is made to its general operation. The machine is automatically started by the oncoming bar from the plodder as it proceeds along the way. At a determinate point in the path of the bar a mechanism is provided which, when actuated by the engagement of the outer end of the oncoming bar, operates through other connected mechanisms to start the machine which is then allowed to have a determinate cycle of movement. Immediately upon the starting of the machine a section b of determinate length is cut from the bar fed out of the plodder and this section is carried forward along the way ahead of the oncoming bar until the forward end of the section encounters a stop 9 at the rear end of the way. Thereupon in the operation of the machine the severed bar or section is displaced laterally from the way out of the path of the oncoming bar and against the wires of a cutter.

Reference will now be made to the various mechanisms by which these and other incidental operations are accomplished.

Figures 6, 7:
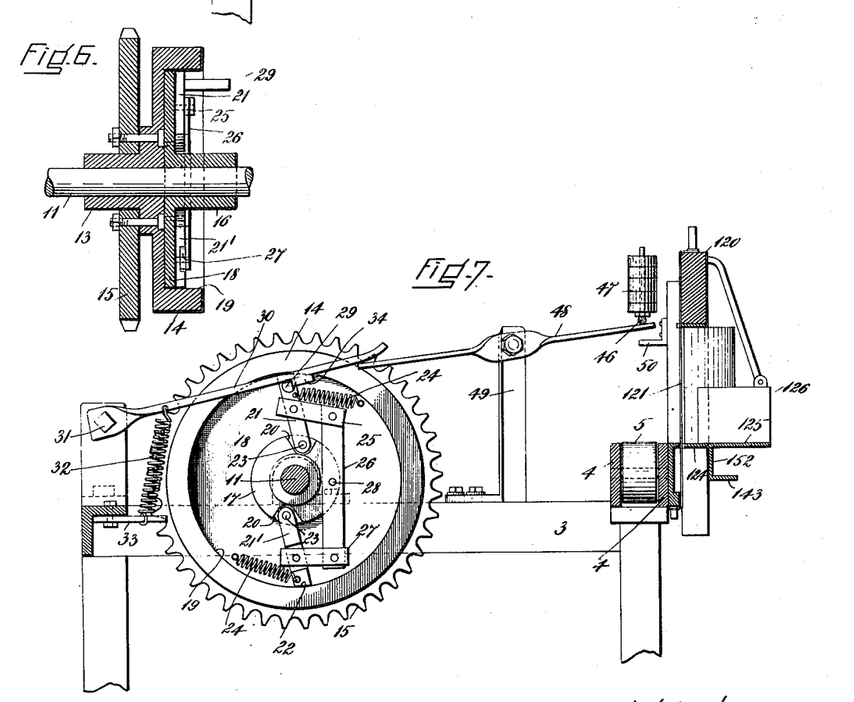

11 represents the main shaft journaled to turn in bearings 12 on the frame. Arranged upon this shaft is a sleeve 13 carrying a cylindrical clutch member 14 (see Figs. 6 and 7). Bolted to the outer side of this clutch member is a power-driven sprocket 15. The sprocket and attached clutch member turn freely upon the shaft. The sprocket is driven by any suitable source of power (not shown). Arranged also upon the shaft and fast thereto is a sleeve 16. This sleeve is provided with a thickened hub-forming portion 17 located within the hollow of the clutch member 14 and having extending from it an annular plate 18 which lies within the hollow of the clutch member 14 just adjacent the inner side thereof and extends outwardly just short of the inner side or face 19 of the clutch member 14. The hub is provided with sockets 20 oppositely arranged and seated to turn within these sockets are clutch-forming bars 21, 21', which extend outwardly in the general direction of the interior surface 19 of the clutch member 14. The outer ends 22 of the bars are made beveled and they are adapted to make clutch-forming engagement with the interior surface 19 of the clutch member 14 or to be movable out of engagement therewith as the bars are turned within their respective sockets. As the inner ends of the bars turn within their sockets they turn pivotally on headed pins or screws 23 which extend through them and fasten into the hub 17. These pins are for the purpose of preventing lateral displacement of the inner ends of the bars. The end thrust which is occasioned when the bars make clutch-forming engagement with the surface 19 of the clutch member 14 is borne by the walls of the sockets within which the inner ends of the bars are contained, and not by the pins.

The bars 21, 21' are held normally in engagement with the clutch member 14, each by means of a spring 24, one end of which is fastened to the bar and the other to the plate 18 carried by the hub 17 as aforesaid.

The bars are moved out of engagement with the clutch member 14 in the following manner: Connecting the two bars are a series of links 25, 26, 27. These links are pivoted to the respective bars, to one another, and the intermediate connecting link 26 is pivoted by a pin 28 to the outer face of the hub 17. Extending laterally from the bar 21 at a point just inwardly removed from the outer end thereof is a pin 29. This pin projects outside the hollow of the clutch member 14. Extending over this pin is an arm 30 secured by fastening 31 to the frame and maintained to have normal engagement with the pin by means of a spring 32 interposed between the arm and a bracket 33 on the frame. The arm 30 is provided on the inner side thereof facing the pin with a stop 34. In the operation of the clutch, assuming the bars 21, 21' to be in engagement with the clutch member 14, as the clutch is turned the pin 29 will come into contact with the stop 34 and thereupon, through the linkage above referred to, the two bars will simultaneously be moved out of contact with the clutch member 14 and be maintained out of contact until the release of the stop. The stop is moved out of the way of the pin by lifting the arm 30 when the two bars influenced by the springs 24 instantly make their clutch-forming engagement and thereupon the entire clutch and shaft with it will turn through one complete cycle of movement, when upon the release of the arm, the pin will again engage the stop and the clutch thereupon become disengaged.

Figure 10:
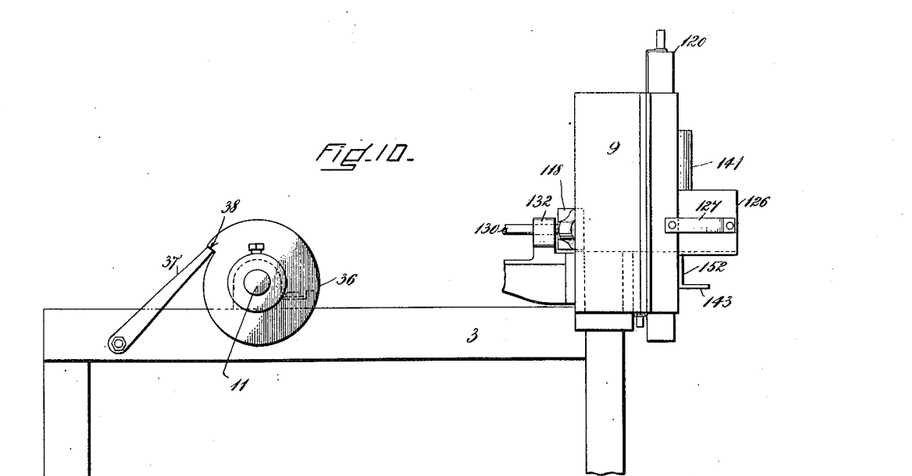
Fig. 10 is a side elevation of certain parts at the rear end of the machine.

To prevent back-lash of the shaft following the disengagement of the clutch, the shaft is provided with a cam 36 against which bears an arm 37 pivoted to the frame. The arm by gravity bears constantly against the peripheral surface of this cam and immediately upon the disconnection of the clutch is adapted to slip behind a shoulder 38 on the cam, thereby preventing any kickback by the shaft (see Fig. 10).

Figure 1:
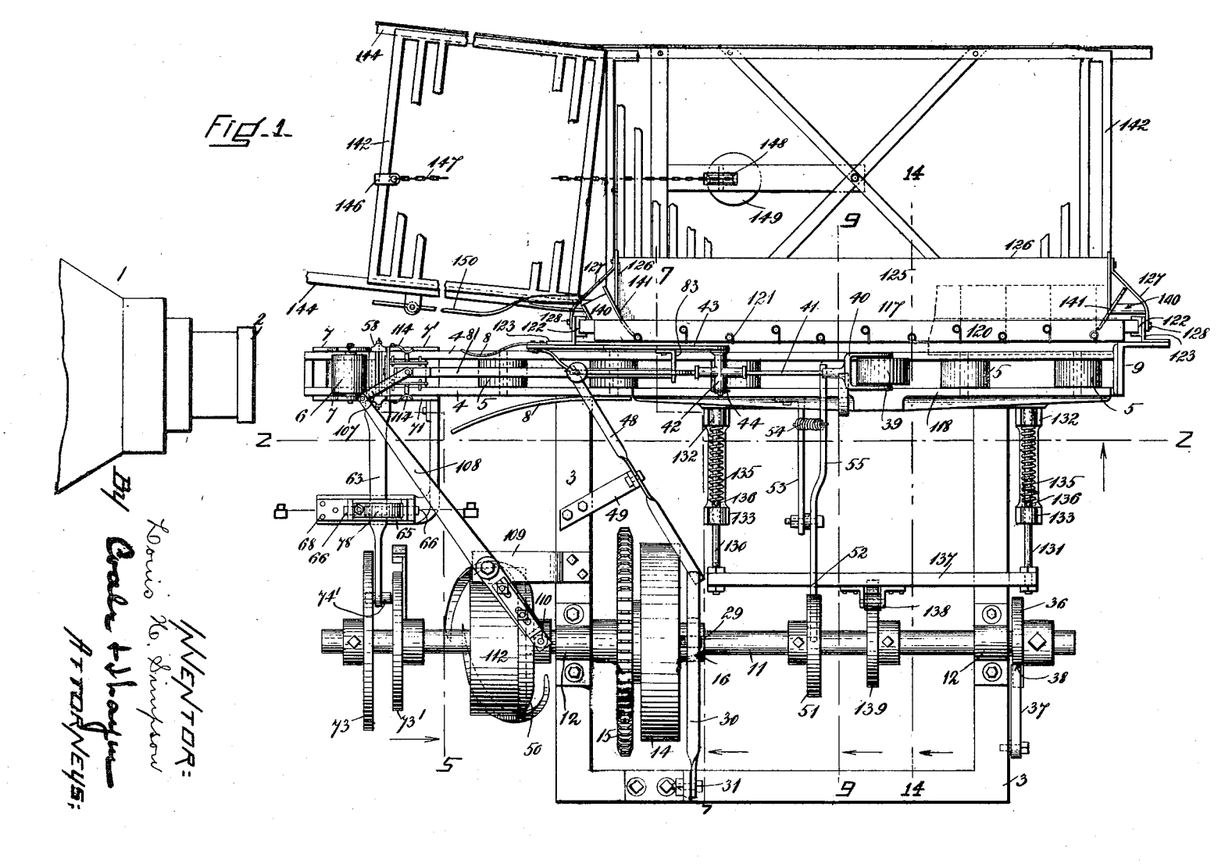
Figure 1 is a plan of the machine.
Figure 2:
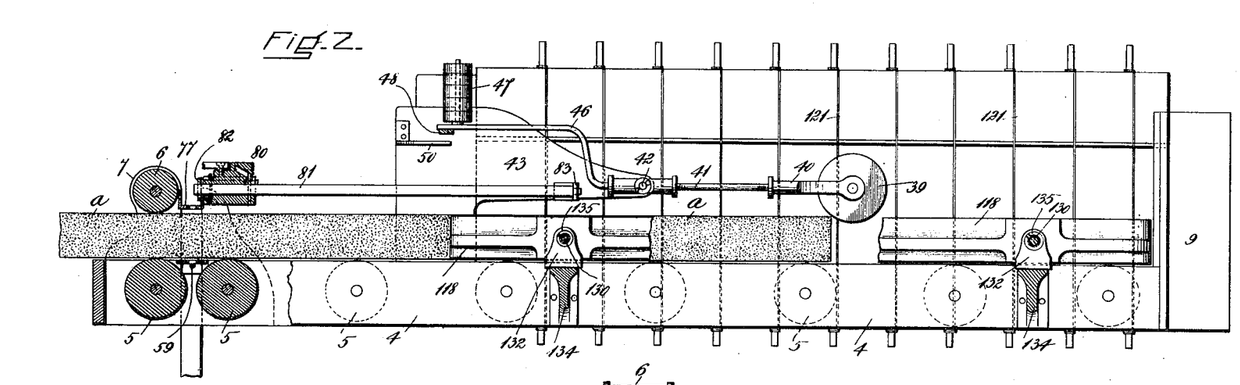
Fig. 2 is a section on the line 2—2 of Fig. 1.

Assuming the clutch to be disengaged by engagement of the pin 29 with the stop 34 and the power-driven sprocket to be freely rotating upon the shaft, the clutch is thrown into engagement and the shaft thereupon operated by a release of the stop 34 from the pin 29, and this is effected by the bar of soap issuing from the plodder as it proceeds along the way provided for it as follows: At a certain point in this way, some little distance removed from the outer end thereof, is a rotary contact or wheel 39. This wheel is journaled to turn within the forked end 40 of a lever 41. This lever is arranged in line with, and above, the way along which the soap is passing and is fitted with a trunnion 42 which turns between a plate 43 attached to one of the side rails 4 and a supporting bracket 44 on the other rail. The arrangement of the lever is such that the wheel 39 will lie in the path of the bar of soap coming from the plodder so that the inner end of this bar will contact with the wheel, lifting it and thereby turning the lever. The arm 46 of the lever 41, opposite to that on which the wheel is mounted, is provided with a counterbalancing weight 47 which permits the wheel to assume a gravitated position in line with the bar of soap as aforesaid, but prevents the wheel exerting any pressure upon the bar as it becomes elevated thereby and the lever turned. As the lever 41 becomes turned by the soap as aforesaid, the outer end of the arm 46 thereof is brought into contact with the end of a lever 48 pivoted to a bracket 49 on the frame and turns the lever 48 (see Fig. 1). The lever 48 extends beneath the stop arm 30 which controls the clutch, this arm becoming lifted by the turning of the lever 48, and thereby permitting the clutch being thrown into engagement. To prevent any undue turning of the levers 41 and 48 or any turning in excess of that necessary to their operation as just referred to, a stop 50 is provided on the fixed plate 43 which limits the throw of the lever 48. The engagement of the wheel 39 with the inner end of the bar of soap is but a momentary one, sufficient only to throw in the clutch and start the machine.

Figures 8, 9:
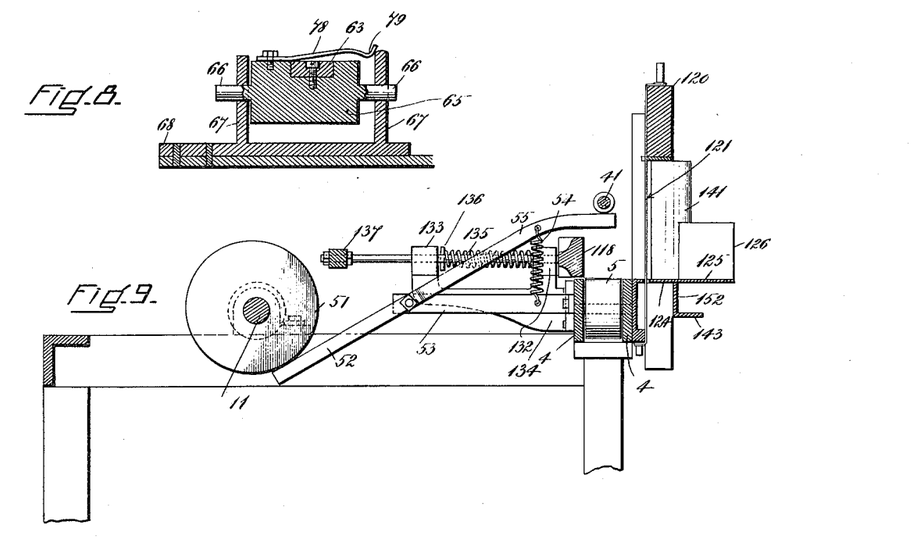
Fig. 8 is a section on the line 8—8 of Fig. 1.
Fig. 9 is a section on the line 9—9 of Fig. 1.

To prevent the wheel riding along the top surface of the oncoming bar of soap and marring such surface, means are provided whereby the wheel may become elevated away from the soap the instant the machine is set in operation. This comprises a cam 51 on the main shaft (see Fig. 9). Engaging the surface of this cam is a lever 52 pivoted to a bracket 53 fixed to one of the side rails and held in contact with the cam by means of a spring 54 interposed between the arm 55 of the lever and the bracket 53 beyond the pivotal connection. The arm 55 of the lever extends beneath the lever 41 which carries the wheel 39. The arrangement of the parts is such that the instant the machine is started and the shaft turned the cam 51 will operate through the lever 52 to elevate the wheel 39 and lift it away from the bar of soap, maintaining it in its elevated position until the bar of soap or rather that detached part or section thereof, to which reference will later be made, has been disposed of, when the lever 52 will be allowed to return and the wheel 39 to resume its normal position. In addition to the function just described the outer end of the lever 52, when not functioning as aforesaid, acts to prevent any undue dropping of that end of the lever 41 carrying the wheel 39 as it provides a stop against which the lever 41 may turn for holding the wheel in just the right position to receive the contact of, and be elevated by the bar of soap.

Figures 3, 4:
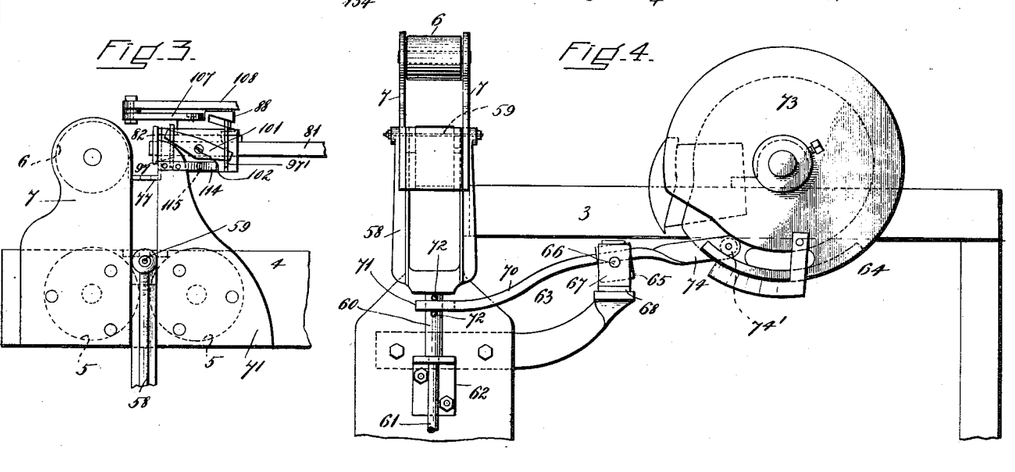
Figure 5:
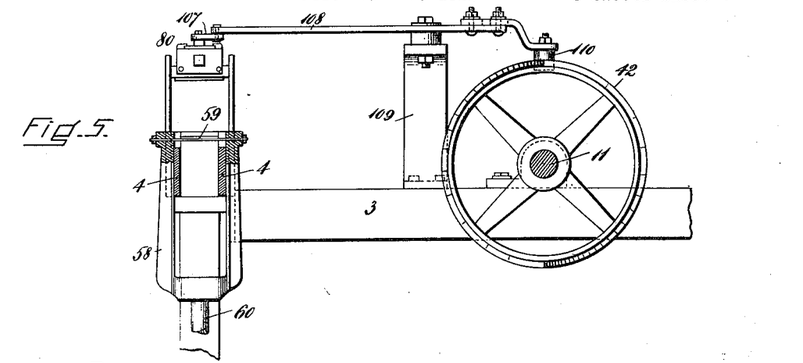
Fig. 5 is a section on line 5—5 of Fig. 1.

The wheel 39 in addition to its function of starting the machine, functions also to measure off a determinate length of bar section from the oncoming bar of soap out of the plodder and this bar section thus determined is instantly cut off, for the instant the machine is started mechanism now to be described operates to immediately sever a bar section from the continuous bar issuing from the plodder. Such mechanism is as follows:—(See Figs. 1, 4 and 5.)

Figure 11:
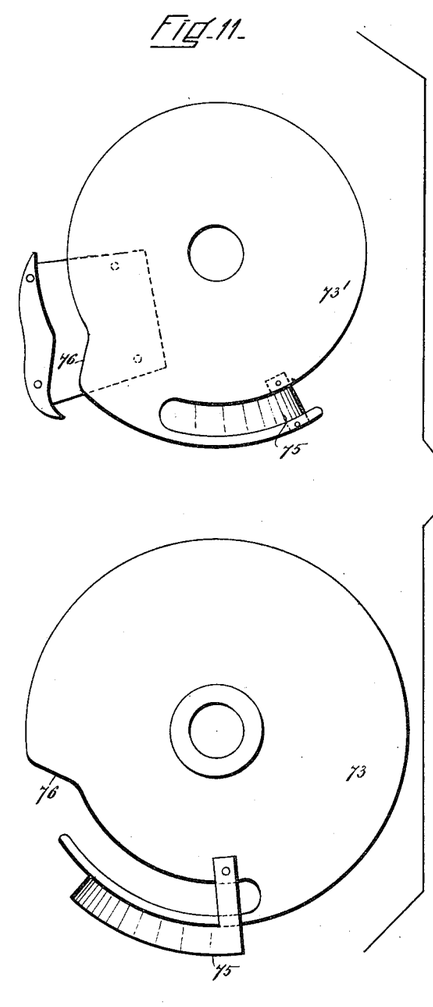
Fig. 11 shows side elevations of the respective sections of the double-faced cam.
Figure 12:
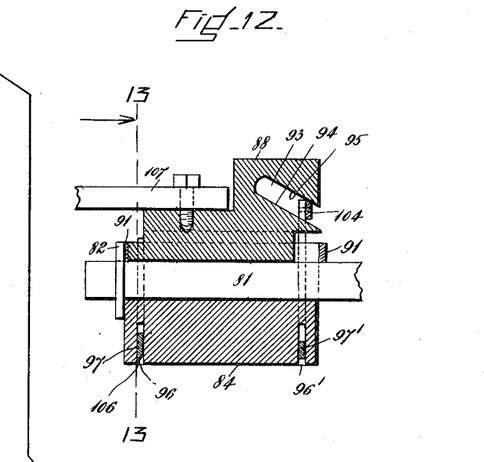
Figure 13:
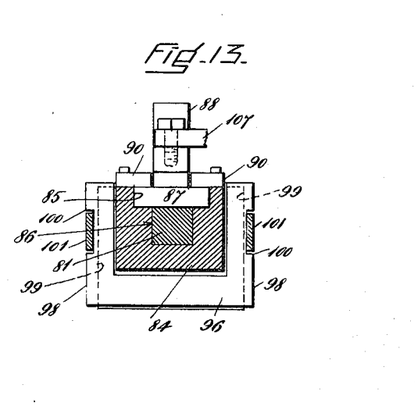
Fig. 13 is a section on the line 13—13 of Fig. 12.

Extending upwardly by the rails 4 on either side thereof between the side plates 7, 7 and other similar plates 7', 7', fixed to the side rails, is a yoke 58 bearing in the head thereof a cross wire 59. Extending from the bottom end of the yoke is a stem 60 from which extends a stem 61 of less diameter, which extends through a guide 62 fixed to the frame of the machine. Thus mounted the yoke and attached wire are vertically movable. The wire 59 cuts through the bar of soap issuing from the plodder upon both the up and down stroke of the yoke, one cut being made on the down stroke of the yoke for cutting off a bar section and the next succeeding bar section being severed on the up stroke of the yoke. The yoke is operated by a lever 63 from off a cam 64 on the main shaft. The lever 63 is fixed to a block 65 having trunnions 66 pivotally mounted to turn in spaced bearings 67 on a bracket 68 fixed to the frame. The arm 70 of the lever is provided with a bifurcated end 71 which straddles the stem 60 of the yoke between pins 72, 72 thereon. The cam which operates the lever is a double-faced cam having separate cam wheels 73, 73'. The arm 74 of the lever is provided with a cross pin 74' which successively engages the peripheral edge of one or the other of the cam wheels as the arm of the lever is shifted to engage one or the other of the wheels, the lever being thereby moved up or down. The shifting of the lever to engage one or the other of the cam wheels is effected by wings 75 on the respective wheels, the pin engaging one or the other of these wings as the wheel is turned, thereby shifting the lever onto the other wheel. Each of the cam wheels is provided with an abrupt wiping edge 76 (see Fig. 11) which is the edge that actuates the lever either up or down depending as the lever is in engagement with one wheel or the other. Each of these edges is arranged to function at the very instant the machine is started depending as the lever is in engagement with one cam wheel or the other. The cut is effected upon the initial starting of the machine and is completed by a partial rotation of the cam or rather that cam wheel with which the lever is in engagement. Further rotation of the wheel before it has finished its complete cycle of rotation tends to bring the wing carried by the wheel into contact with the pin on the lever by which the lever is shifted onto the other cam for the next succeeding phase of operation, when a cut will be made by a reverse movement of the cutting wire. The edges 76 on the respective cam wheels are abrupt edges in order that the cut through the bar of soap may be made with great speed so that the cut may be as near a right angle to the longitudinal line of the bar as possible considering that the bar is being continuously fed out of the plodder. Necessarily there must be a slight angle to the cut, but the cut is made so rapidly as to make the angle an inappreciable one. To facilitate making the cut through the bar of soap the bar is backed at the point of the cut by plates 77, 77 arranged, respectively, above and below the bar and slotted to permit of the passage of the wire 59 through them. Each of the plates 77 is secured to the back of the plates 7, 7 fixed to the side rails. As the lever 63 is shifted to engage first one and then the other of the cam wheels 73, 73' the block 65 will be moved laterally between the bearings 67, the lever pivoting on the stem 60 of the yoke. For the purpose of maintaining the lever in the position to which it is shifted the block 65 has attached to it a spring 78 having a bent end 79 which engages one of the bearings 67 on one side or the other thereof for holding the lever in place (see Fig. 8).

The bar section having been severed, the next phase of operation tends to carry the severed section forward in the machine until the forward end of the severed bar encounters the stop 9 at the end of the way. To this end the following mechanism is provided:—(See Figs. 1, 2, 3, 12 and 13).

Arranged immediately in front of the cutting yoke above the way along which the soap passes is a soap gripping and carrying device 80. This device is arranged to slide upon a rectangular guide bar 81 fixed between a cross plate 82, attached to the rear side of the plates 7', 7', and a bracket 83 fixed to the plate 43 on the frame. The guide bar is parallel to the central line of the way and above the soap thereon. The body of the device 80 comprises a block 84 having a slot 85 along the top and beneath the slot a narrower channel 86 in which slidably fits the guide bar 81. Contained within the slot 85 is the flanged bar 87 of a head piece 88. Extending over the flanges of the bar 87 are plates 90 fixed to the block 84. The head piece 88 is slightly shorter than the block and is held in place against endwise displacement by plates 91 fastened to the front and rear ends of the block. The block and head piece are thus connected to be slidable upon the guide bar, the head piece being permitted to have a slight endwise movement relatively to the block. Attention is also directed to the inclined slot 93 at the forward end of the head piece which slot has inclined surfaces 94 and 95, respectively. Cut in the under side of the block at the front and back are deep vertical slots 96, 96'. Movable vertically within these slots are plates 97, 97', respectively. Both plates extend laterally slightly beyond the sides of the block and at either end thereof each is provided with vertical side pieces 98 which fit slidably in vertical slots 99 cut in the opposite sides of the block. Slots 100 are cut in each of the side pieces 98 into which fit the opposite ends of levers 101 pivoted by pins 102 to the opposite sides of the block. Thus connected the plates 97, 97' on the pivoting of the respective levers are movable vertically in opposite directions. The side pieces 98 to the plate 97' are connected at their ends by a cross bar 104. This cross bar is contained within the inclined slot 93 in the head piece and with it the inclined surfaces 94, 95 have engagement as the head piece is moved with a forward and backward movement relatively to the block. The forward movement of the head piece brings the inclined surface 94 into engagement with the cross bar thereby lifting the plate 97' and depressing the plate 97. On a reverse movement the inclined edge 95 engages the cross bar depressing the plate 97' and lifting the plate 97. The plate 97 is provided with a cutting edge 106 which upon the depression of the plate bites into the detached bar of soap just forward of its rear end. When the plate 97 is lifted its cutting edge will be lifted clear of the soap into the slot in the block. The plate 97 does not leave the slot in which it is contained as it is moved up and down therein.

Pivoted to the top side of the head piece 88 is a link 107. This link is pivotally connected to the outer end of a lever 108 which is pivoted to a bracket 109 on the frame. At its inner end the lever 108 carries a pin 110 engaged by a worm cam 112 on the main shaft. The general arrangement of the parts is such that immediately following the cutting off of the bar section the cam 112 through the connecting lever and link will first move forward the head piece 88 and thereby drive the cutting edge 106 into the soap and thereupon by further operation of the cam the entire device 80 will be moved along the guide bar 81 carrying the detached bar section with it and moving it ahead of the oncoming bar to the end of the way against the stop 9. Thereupon the cam still operating will move back the head piece 88, withdrawing the cutting edge from the soap and afterwards return the device 80 to its original position of bearing against the cross plate 82 at the inner end of the guide bar, all being effected by a single rotation of the cam. In order that the head piece 88 may positively be moved ahead of the block 84 at the beginning of the operation for depressing the cutting edge 106, the block is preferably releasably held by springs 114 on the side rails 4, 4 which enter indents 115 in the opposite sides of the block. These springs act also to hold and position the block when returned as aforesaid to its starting position.

The bar section having been located at the end of the way as just outlined, lies between a cutter 117 on the one side and a pusher 118 on the side opposite. The cutter comprises a rectangular frame 120 across which are strung a series of wires 121 separated from one another a distance equal to the length of the cake of soap to be cut. The frame of the cutter is held in place by channelled bars 122 fixed to angle pieces 123 on the frame of the machine. The frame of the cutter may be slid vertically into the ways provided by the channelled bars 122 thus providing an easy removal or change of the cutter as occasion requires. The top surface 124 of the bottom frame bar of the cutter is flush with the top of the rolls 5 along the way upon which the bar section is resting. Flush with the surface 124 presented by the frame bar is a surface 125 presented by an apron 126 for holding the cakes of soap which have been severed and off which the cakes are gradually pushed onto a receiving rack during the operation of the machine, as will later be explained. The apron 126 comprises an attachable part hung by hook-forming arms 127 at either end thereof which catch onto pins 128 extending from the angle pieces to which the channelled bars 122 are affixed.

The pusher 118 comprises a flat-faced bar about equal in length to that of the severed bar section, the vertical dimension of its face being about equal to the height or thickness of the bar of soap. Laterally projecting from the back of the bar adjacent either end thereof are rods 130, 131. Each of these rods extends through and is movable endwise within spaced guides 132, 133 carried by brackets 134 fixed to the frame. Arranged upon the respective rods between the guides is a spring 135 with a cross pin 136 extending through the rod and bearing against the side of the outer guides 133 when the bar is occupying its normal inactive position at the side of the way. The outer ends of the rods beyond the guides are connected by a cross bar 137. This bar is provided at its centre with a roller 138. Arranged to have engagement with this roller is a cam 139 on the main shaft. With the parts thus arranged the cam operates, when the bar section has been located in front of the cutter, to throw the pusher laterally across the way occupied by the bar section and thereby move the bar section laterally from the way against the wires of the cutter. On the completion of this operation the pressure exerted by the cam will become relieved and the pusher instantly returned to its normal position by the springs 135, the whole movement being completed during a single rotation of the shaft.

Figures 14, 15, 16:
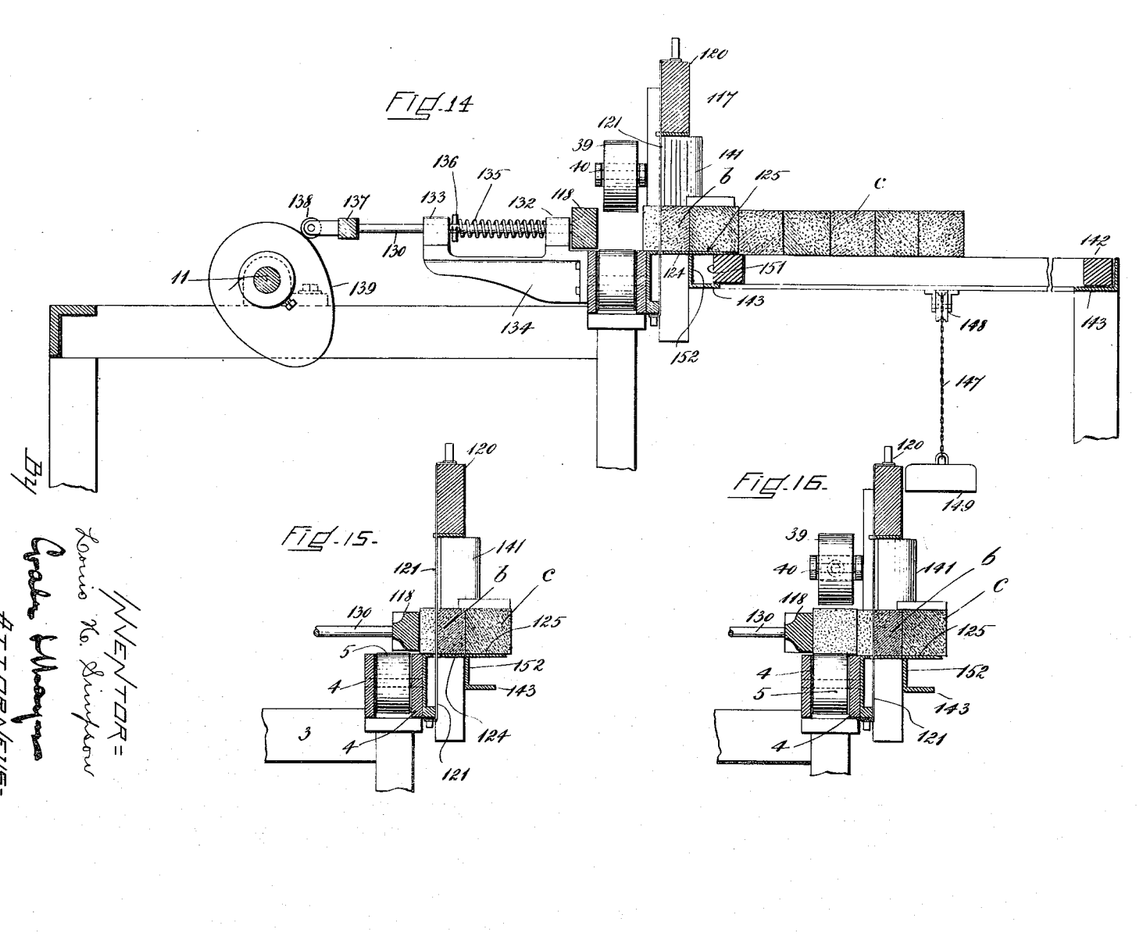
Fig. 14 is a section on the line 14—14 of Fig. 1.
Figs. 15 and 16 are sections of the machine pertaining especially to the pusher and cutter, showing different positions assumed by the pusher in relation to the bar of soap to be cut.

The pusher does not push the bar section entirely through the wires at one stroke but only partially through the wires as may be seen by reference to Fig. 14, the bar section to be cut being left within the wires until the next operation of the pusher when the displacement of the next succeeding bar section to be cut acts to complete the cutting, the succeeding bar in turn being left in the cutter. During the succeeding operation of the pusher the cakes severed by the cutter will gradually be moved out over the face of the apron 126 in successive lines or rows. It is necessary that the ends of the bar sections be trimmed in order to have a square end on the end cakes when cut inasmuch as the cross wire 59 which separates the bar section from the continuous bar out of the plodder does not cut the bar to present an exact square end. Accordingly the cutting wires are so arranged in front of the bar section that the ends thereof will be clipped off without undue waste of material. The ends thus severed fall through channels 140 at either end of the cutter and are collected in receptacles (not shown) arranged below the machine. In connection with these clipped ends, it is to be noted that the inner ends of the sides 141 of the channels are precisely flush with the end wires of the cutter so that the clipped ends of the bar will properly become directed into the channels.

The cakes of soap are pushed out over the face of the apron and onto a rack 142 by the operation of the pusher 118 as successive bars of soap are cut. The rack loosely rests upon a bed 143 forming a part of the frame of the machine, and the rack is so disposed as to extend under the apron with the face of the rack slightly below that of the apron so that the cakes of soap will readily pass from the apron onto the rack. As the cakes of soap become deposited upon the rack successive lines thereof will be pushed out over the face of the rack by the pusher operating through the lines of cakes on the apron. When a sufficient number of lines become deposited on the rack the filled rack is removed and a fresh rack put in its place.

In order that the filled rack may be removed quickly and a fresh rack take its place in the relatively brief time interval between the cuttings, arrangement is made whereby a fresh or unfilled rack will automatically be moved into the place occupied by the filled rack and assist in its removal. To this end a fresh rack is laid within a guideway 144 at one side of the bed on which the filled rack is resting and from which guideway the unfilled rack is directly movable onto the bed.

Caught onto the rear end of the fresh or unfilled rack thus lying in the guideway is a hook 146 bearing a chain 147 which passes over a pulley 148 on the frame and carries a weight 149. This weight exerts a constant force tending to move the unfilled rack into the position on the bed occupied by the filled rack. The unfilled rack is held in place by a latch 150 on the frame, the weight being allowed to operate for moving the unfilled rack only when the latch is released.

The unfilled rack in the guideway is so arranged that the forward end thereof will abut against the adjacent side or end of the filled rack when on its bed so that when the latch is released enabling the weight to function the movement of the unfilled rack will assist in laterally displacing the filled rack. The weight 149 will exert no influence upon the unfilled rack after it has become deposited on the bed, the rack thus deposited being manually positioned after which a fresh rack is placed in the guideway and the weight again connected to the rear end thereof and the latch applied.

It will be observed that as the filled rack is moved off its bed it will be moved in a direction parallel with the end of the apron and outer line of soap resting on the apron. In order to obtain a proper clearance when the filled rack is removed between the innermost line of soap on the rack and the end of the apron and the outer line of soap resting thereon, arrangement is made whereby as each successive line of soap is deposited upon the apron it will be pushed clear of the outer edge of the apron, the line of soap directly back of it on the apron being left to overlap the outer edge thereof, as may be seen by reference to Fig. 14. In other words, no line of soap is left partly resting upon the apron and partly on the rack when the rack is removed. It is also so arranged that the inner end 151 of the rack or that end lying beneath the apron will be positioned short of the end 152 on the bed. Just before the rack is removed it is manually pushed inwardly until the inner end 151 of the rack encounters the end 152 of the bed with the effect of outwardly displacing the lines of soap on the rack so that when the rack is withdrawn to its original position the innermost line of soap thereon will lie clear of the outermost line of soap resting upon the apron and overlapping the edge thereof thus enabling the rack to be removed without disturbing any of the cakes of soap.

The general operation is as follows: As the main bar $a$ issues from the plodder it enters upon and passes along the way until it encounters the rotary contact or wheel 39, elevating this contact. Thereupon through connecting mechanism the clutch members are made to have engagement with one another and the main shaft rotated a single cycle of revolution when the clutch members again become disengaged and the shaft stopped. Immediately upon the starting of the main shaft and in fact at the very instant of its starting, the cam 51 on the shaft operates through connecting mechanism to lift the contact wheel 39 away from the soap and prevent its riding thereon. At the same instant one or the other of the cam wheels 73, 73' on the main shaft will operate through connecting mechanism to pass the cross wire 59 through the oncoming main bar of soap from the plodder and thereby a severed or detached bar section $b$ is obtained. In this connection it will be observed that the bar section $b$ is one of a determinate length irrespective of the rate of speed the main bar is feeding, for its length is determined by the contact of its outer end with a controlling member occupying a relatively constant position and the ensuing operations leading up to the severance of the bar section $b$ are practically instantaneous owing to the rapidity of the operations.

Immediately upon the severance of the bar section $b$ the cam 112 on the main shaft will operate through connecting mechanism to actuate the device 80 to grip the rear end of the detached bar section and thereby the detached bar, through continued operation of the cam 112, will be carried ahead of the oncoming bar to the end of the way and located in a position in the path of the oncoming bar between the cutter 117 on the one side and the pusher 118 on the side opposite. When the detached bar has thus become located the further continued operation of the cam 112 will act to release the device 80 from the soap and return it to its initial position ready to grip the next succeeding detached bar.

Immediately upon the location of the detached bar as aforesaid the cam 139 on the main shaft will operate through the pusher to carry the detached bar laterally off the way and onto the wires of the cutter, this action taking place before the oncoming bar from the plodder has reached the inner end of the detached bar. In fact all the operations take place during a single rotation of the main shaft and accordingly the detached bar need be displaced but a short distance from the main bar out of the plodder that succeeding operations may properly ensue.

Successive operations of the pusher act to press each detached bar through the wires of the cutter and as the operations of the pusher are continued lines of cakes are moved over the face of the apron and deposited upon the rack in parallel rows or lines. When a sufficient number of cakes has accumulated on the rack (usually eight or ten rows) the rack is removed, as previously explained, the cakes of soap then being left on the rack in position best suited for their further handling. The filled rack is removed and replaced by a fresh rack in the interval between cuts, the arrangement described easily permitting of this although the time interval between cuts is relatively short.

While the machine is especially adapted and designed for use as a soap-cutting machine, it is also useful for cutting any plastic material into cakes which is capable of being fed in the form of a continuous bar as soap is fed.

Having thus fully described my invention, I claim and desire to secure by Letters Patent of the United States;—

1. A machine of the type specified comprising in combination a stationary way onto which is received a main bar of plastic material continuously fed, a power-operated mechanism, means for controlling said mechanism to function at intervals, means operated from off said mechanism for severing bar sections from the main bar during the feed thereof, means operable from off said mechanism for engaging and moving each severed bar section along said way ahead of the main bar into a determinate position in the path of said bar, and mechanism for afterward moving said severed section out of the path of the main bar and cutting it into cakes.

2. A machine of the type specified comprising in combination a stationary way onto which is received a main bar of plastic material continuously fed, a power-operated mechanism, means controlled by the main bar during the feed thereof for controlling said mechanism to function at intervals, means operated from off said mechanism for severing bar sections from the main bar during the feed thereof, a cutter located adjacent said way, means operable from off said mechanism for engaging and moving each severed bar section along said way ahead of the main bar into a determinate position in the path of said bar alongside said cutter, and means operated by said mechanism for moving the severed bar section out of the path of said main bar onto said cutter.

3. A machine of the character specified comprising in combination means for receiving a main bar of plastic material continuously fed, a power-operated mechanism, means for controlling said mechanism to function at intervals, a cutter movable in reverse directions crosswise said bar during the feed thereof and functioning to sever a bar section from the main bar as the cutter is moved in either of said directions, means operated from off said mechanism for moving said cutter in one direction or the other, means operated from off said mechanism for engaging and moving each severed bar section away from the main bar to a determinate position, and means for cutting the removed bar section into cakes.

4. In a machine of the character specified, the combination comprising a stationary way onto which is received a main bar of plastic material continuously fed, a power-operated mechanism, means for controlling said mechanism to function at intervals, a cutter movable in reverse directions crosswise the main bar during the feed thereof and functioning to sever a bar section from the said bar as the cutter is moved in either of said directions, means operated from off said mechanism for moving said cutter in one direction or the other, means operated from off said mechanism for engaging and moving each severed bar section along said way ahead of the main bar into a determinate position in the path of said bar, and means for afterward moving said severed section out of the path of the main bar and cutting it into cakes.

5. A machine of the character specified comprising in combination a stationary way onto which is received a main bar of plastic material continuously fed, a power-operated mechanism, means controlled by the main bar during the feed thereof for controlling said mechanism to function at intervals, a cutter movable in reverse directions, crosswise the main bar during the feed thereof and functioning to sever a bar section from the main bar as the cutter is moved in either of said directions means operated from off said mechanism for moving said cutter in one direction or the other, a cutter for severing each detached bar section into cakes located adjacent said way, means operable from off said mechanism for engaging and moving each severed bar section along said way ahead of the main bar into a determinate position in the path of said bar alongside said last-named cutter, and means operated by said mechanism for moving the severed bar section out of the path of said main bar onto said last-named cutter.

6. A machine of the type specified comprising, in combination, means for receiving and supporting a main bar of plastic material continuously fed, mechanism for severing bar sections from the main bar during the feed thereof, mechanism for moving each severed bar section away from the main bar during the feed thereof into a position for cutting, a cutter, mechanism assisting in the cutting of each severed bar section positioned as aforesaid, a power-driven shaft from off which said several mechanisms are operable, means controlling the operation of said shaft, and other means controlling said last-named means controlled by said main bar during the feed thereof.

7. A machine of the type specified comprising, in combination, means for receiving and supporting a main bar of plastic material continuously fed, mechanism for severing bar sections from the main bar during the feed thereof, mechanism for moving each severed bar section away from the main bar during the feed thereof into a position for cutting, a cutter, mechanism assisting in the cutting of each severed bar section positioned as aforesaid, a power-driven shaft from off which said several mechanisms are operable, means controlling the operation of said shaft by which said shaft may be rotated a determinate amount at intervals, and means controlled by said main bar during the feed thereof for controlling said last-named means.

8. A machine of the type specified comprising, in combination, means for receiving and supporting a main bar of plastic material continuously fed, mechanism for severing bar sections from the main bar during the feed thereof, mechanism for moving each severed bar section away from the main bar during the feed thereof into a position for cutting, a cutter, mechanism assisting in the cutting of each severed bar section positioned as aforesaid, a power-driven shaft off which said several mechanisms are operable, a clutch controlling the operation of said shaft and having separate clutch members, releasable means controlling said clutch members and permitting upon the release thereof of engagement between said members and a single revolution of said shaft, and means operated by said main bar during the feed thereof for releasing said releasable means to function as aforesaid.

9. A machine of the type specified comprising, in combination, means for receiving and supporting a main bar of plastic material continuously fed, mechanism for severing bar sections from the main bar during the feed thereof, mechanism for moving each severed bar section away from the main bar during the feed thereof into a position for cutting, a cutter, mechanism assisting in the cutting of each severed bar section positioned as aforesaid, a main shaft, a power-driven clutch member arranged to turn freely on said shaft, a co-operating clutch member fixed to said shaft, a releasable clutch-controlling member acting to normally maintain said clutch members in a disengaging position and upon the release thereof permitting of engagement between said members and the rotation of said shaft, and means whereby said clutch-controlling member will be released to function by the main bar during the feed thereof.

10. A machine of the type specified comprising, in combination, means for receiving and supporting a main bar of plastic material continuously fed, mechanism for severing bar sections from the main bar during the feed thereof, mechanism for moving each severed bar section away from the main bar during the feed thereof into a position for cutting, a cutter, mechanism assisting in the cutting of each severed bar section positioned as aforesaid, a main shaft, a power-driven clutch member arranged to turn freely on said shaft, a co-operating clutch member fixed to said shaft, a releasable clutch-controlling member acting to normally maintain said clutch members in a disengaging position and upon the release thereof permitting of engagement between said members and a single revolution of said shaft, and means whereby said clutch-controlling member will be released by the main bar during the feed thereof.

11. In a machine of the type specified, the combination comprising means for receiving and supporting a main bar of plastic material continuously fed, a power-driven mechanism for severing bar sections from the main bar during the feed thereof, means controlled by the main bar for controlling said mechanism to function at intervals, means for moving each severed bar section away from the main bar and into a position in the path of the main bar within the interval between the severance of such bar section and that of the bar section next succeeding, and means for moving the bar section positioned as aforesaid within the same interval out of the path of the main bar and onto a cutter, and said cutter.

12. In a machine of the character specified, the combination comprising means for receiving and supporting a main bar of plastic material continuously fed, a wire arranged to extend crosswise the bar, a support carrying said wire by which it may be moved in reverse directions relatively to the bar and pass through the bar during the feed thereof as the wire is moved in either of said directions, and a power-driven mechanism in operative engagement with said support for moving it in one direction or the other at timed intervals.

13. In a machine of the character specified, the combination comprising means for receiving and supporting a main bar of plastic material continuously fed, a wire arranged to extend crosswise the bar, a support carrying said wire by which it may be moved in reverse directions relatively to the bar and pass through the bar during the feed thereof as the wire is moved in either of said directions, and a power-driven mechanism in operative engagement with said support for moving it in one direction or the other at intervals determined by said main bar.

14. In a machine of the character specified, the combination comprising means for receiving and supporting a main bar of plastic material continuously fed, a wire arranged to extend crosswise the bar, a support carrying said wire by which it may be moved in reverse directions relatively to the bar and passed through the bar during the feed thereof as the wire is moved in either of said directions, a power-driven shaft, a double-faced cam carried by said shaft, a lever in operative engagement with said cam and said support, and means for pivotally supporting said lever permitting of the shifting thereof onto one or the other of the faces presented by said cam and by which said lever is reciprocated to move said wire in one direction or the other, said cam being provided with means for shifting said lever as aforesaid.

15. In a machine of the character specified, the combination comprising means for receiving and supporting a main bar of plastic material continuously fed, a wire arranged to extend crosswise the bar, a support carrying said wire by which it may be moved in reverse directions relatively to the bar and passed through the bar during the feed thereof as the wire is moved in either of said directions, a power-driven shaft, a double-faced cam carried by said shaft, a lever in operative engagement with said cam and said support, and means for pivotally supporting said lever permitting of the shifting thereof onto one or the other of the faces presented by said cam and by which said lever is reciprocated to move said wire in one direction or the other, said cam being provided with means for shifting said lever as aforesaid, and means for holding said lever in place when in engagement with either of the faces of said cam.

16. In a machine of the type specified, the combination comprising means for receiving and supporting a bar of plastic material continuously fed, a lever, a contact member carried by said lever arranged whereby the contact member may be engaged by the front end of said bar during the feed thereof and said lever be thereby turned, a main shaft, and means controlled by said lever for controlling the application of power to said shaft.

17. In a machine of the type specified, the combination comprising means for receiving and supporting a bar of plastic material continuously fed, a lever, a contact member carried by said lever arranged whereby the contact member may be engaged by the front end of said bar during the feed thereof and said lever be thereby turned, a main shaft, means controlled by said lever for controlling the application of power to said shaft, and means operable from off said shaft and functioning to lift said contact member away from said bar immediately following the engagement of the bar therewith as aforesaid.

18. In a machine of the type specified, the combination comprising a way onto which is received a main bar of plastic material continuously fed, a power-operated mechanism, means for severing bar sections from the main bar during the feed thereof, a bar gripping and carrying device having a movable member presenting a biting edge, and mechanism whereby said member may be moved and the biting edge thereof made to engage each severed bar section and afterward said device be moved to move the severed bar section forward along said way ahead of said main bar.

19. In a machine of the type specified, the combination comprising a way onto which is received a main bar of plastic material continuously fed, power-operated mechanism, means for severing bar sections from the main bar during the feed thereof, a bar gripping and carrying device having a movable member presenting a biting edge, and mechanism whereby said member may be moved and the biting edge thereof made to engage each severed bar section and the device then moved to move the section along said way to a determinate position and thereupon the biting edge become moved away from said section and the device returned to its initial position.

20. In a machine of the type specified, a bar gripping and carrying device comprising a sliding block, a guide along which the block is movable, a member presenting a biting edge carried by the block and movable thereon to assume an engaging or disengaging position, a head on said block having a limited endwise movement thereon, and means whereby said member may be moved into its engaging and disengaging positions on moving said head with a forward and reverse movement on said block.

21. In a machine of the type specified, a bar gripping and carrying device comprising a sliding block, a guide along which the block is movable, a member presenting a biting edge carried by said block and movable thereon into an engaging or disengaging position, a head on said block having a limited endwise movement thereon, said head having an inclined slot therein presenting inclined surfaces, a cross bar within said slot, a member movable on the block carrying said bar, and means connecting said members whereby said first-named member will be moved into an engaging or disengaging position on moving said head on the block with a forward and reverse movement.

22. In a machine of the type specified, the combination comprising a way onto which is received a main bar of plastic material continuously fed, power-operated mechanism, means for severing bar sections from the main bar during the feed thereof, a sliding block, a guide along which the block is movable, a member presenting a biting edge carried by the block and movable to engage each severed bar section or be movable into a disengaging position with relation thereto, a head mounted on the block and having a limited endwise movement thereon, means whereby said member may be moved into engagement with said bar section on moving said head on said block with a forward and reverse movement, and mechanism operable from off said power-operated mechanism connecting with said head for moving it on said block and afterward said block along said guide with a forward and reverse movement.

23. A machine of the type specified comprising a way onto which is received a main bar of plastic material continuously fed, a power-operated mechanism, means for controlling said mechanism to operate at intervals, means operable from off said mechanism for severing bar sections from the main bar during the feed thereof, means operable from off said mechanism for gripping and moving each severed bar section away from the main bar at a speed exceeding the main bar and into a determinate position in the path of the main bar, a cutter comprising a frame with wires arranged along side said severed bar section when positioned as aforesaid, a pusher arranged on the opposite side of said bar section positioned as aforesaid, means operable from off said power-operated mechanism to actuate said pusher to move the severed bar section positioned as aforesaid onto the wires of said cutter for cutting the section into cakes, and means whereby cakes resulting from the cutting of a number of bar sections may be deposited in lines upon a rack.

LOUIS H. SIMPSON.